March 5, 1968  D. A. STEAD  3,371,687
HARNESSES FOR JACQUARD MACHINES
Filed July 6, 1966  3 Sheets-Sheet 1
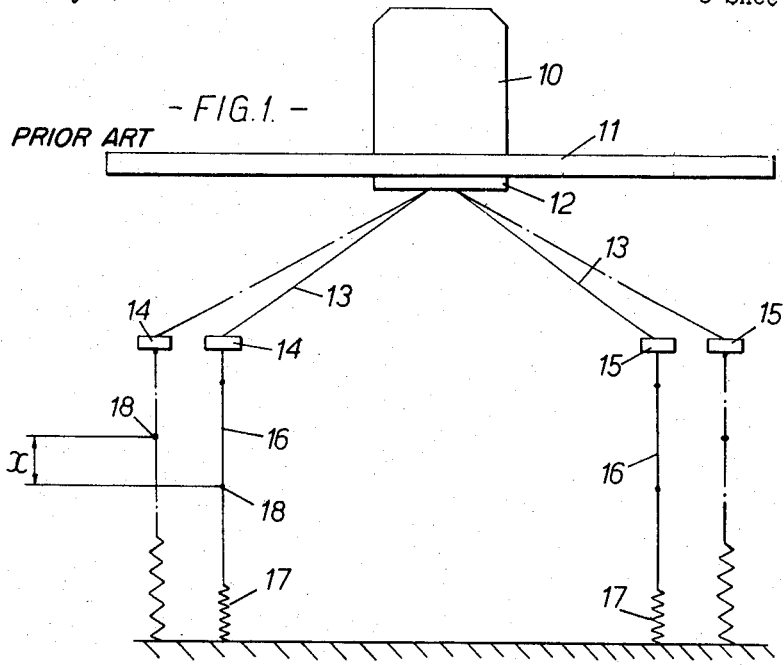
- FIG. 1. -
PRIOR ART
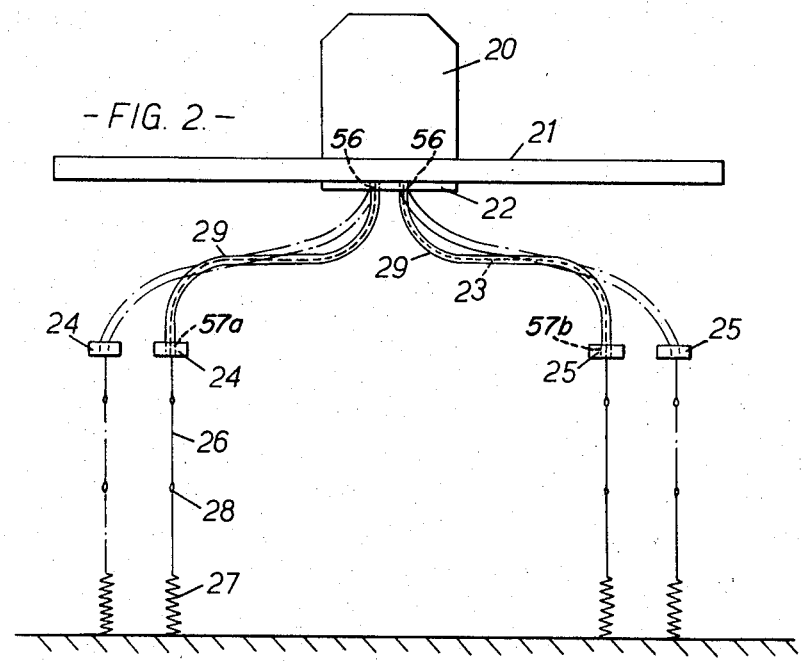
- FIG. 2. -
INVENTOR:
DAVID ANTHONY STEAD
BY Norris & Bateman
Attys

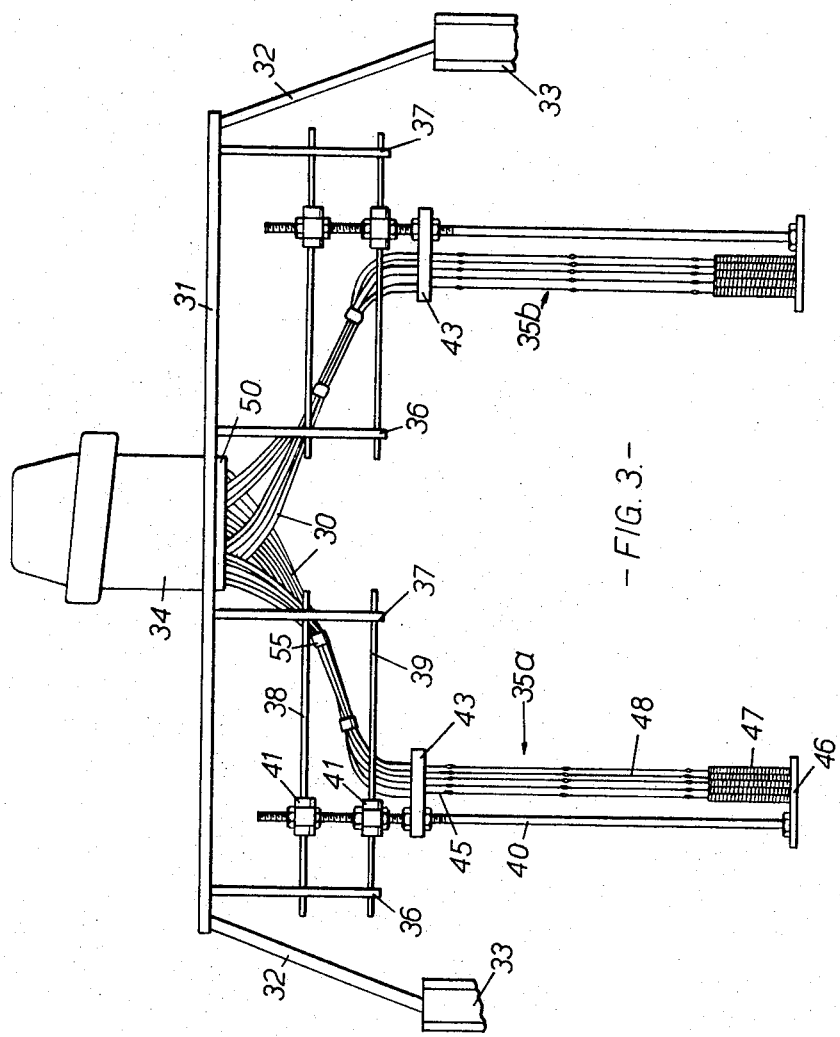

March 5, 1968  D. A. STEAD  3,371,687
HARNESSES FOR JACQUARD MACHINES
Filed July 6, 1966  3 Sheets-Sheet 3
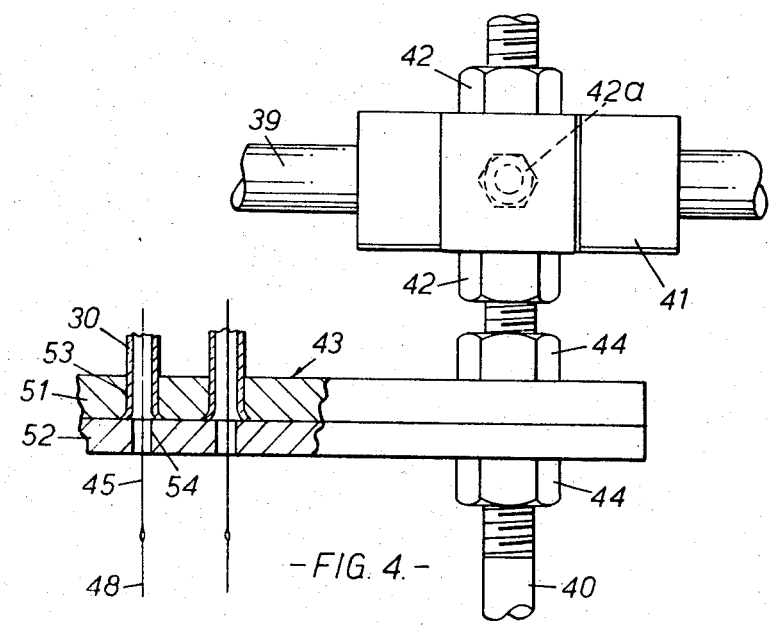
-FIG. 4.-
INVENTOR:
DAVID ANTHONY STEAD
BY Norris Bateman
Attys

United States Patent Office 3,371,687
Patented Mar. 5, 1968

3,371,687
HARNESSES FOR JACQUARD MACHINES
David A. Stead, 8 Haycliffe Lane 5,
Bradford, England
Filed July 6, 1966, Ser. No. 563,214
4 Claims. (Cl. 139—59)

ABSTRACT OF THE DISCLOSURE

Harness cords of a Jacquard mechanism extend between the bottom board and the comber board through a tube that is flexible but capable of retaining a given shape. By changing the tube shape the length of cord between the bottom and the comber boards may be maintained constant in any lateral adjusted position of the comber board, and this dispenses with the need of vertical adjustment of the comber boards which was necessarily attendant to their lateral adjustment, to keep the heald eyes at constant level.

---

When a Jacquard mechanism is used on a loom, there has to be a harness between the Jacquard and the heald wires of the loom. The present invention is concerned with an improved Jacquard harness, and whilst the improvement is capable of use on any kind of Jacquard/loom arrangement, it is most obviously of advantage in relation to selvedge Jacquards.

According to this invention a Jacquard harness for a loom comprises a bottom board and a comberboard spaced from the bottom board and harness cords passing through holes in the bottom board and the comber board, the length of each cord which extends between the two boards being enclosed within a flexible tube.

The invention will now be described as applied to a selvedge Jacquard, by way of example only, with reference to the accompanying drawings in which:

FIGURE 1 is a diagram of a selvedge Jacquard and its harness showing a disadvantage of the known arrangement, FIGURE 2 is a diagram similar to FIGURE 1, but showing the application of the invention, FIGURE 3 is a front view of a selvedge Jacquard incorporating the invention, and FIGURE 4 is a detail view, partly in section to a larger scale of part of the harness shown in FIGURE 3.

Referring to the prior art arrangement shown in FIGURE 1, a selvedge Jacquard mechanism 10 of known kind is fixed to a frame 11 which extends across the width of the loom. The frame 11 may in fact be part of the loom frame. On the underside of the frame 11 there is a bottom board 12 which forms part of the Jacquard mechanism. The bottom board is drilled as is usual to provide guide holes for the actual harness cords, shown emerging from the underside of the bottomboard at 13. Inside the Jacquard 10, each cord 13 is attached to a Jacquard hook in the conventional manner.

Two small comber boards 14 and 15 are provided, and each of these is drilled to receive its share of the cords 13. Comberboards are well known in the art and they have to be positioned so that the harness cords are vertical on the underside of each comberboard. At their lower ends, each cord 13 is attached to the top end of a heald wire 16, and a spring or lingo extends between the lower end of each heald wire and a fixed anchor. Consequently, the healds are pulled into a lowered position by the springs or lingoes 17.

As shown in full lines the comber boards are set for weaving selvedges on a fabric. Between the bottom board 12 and the comber boards 14 and 15, the cords 13 fan out (only one cord for each comber board is illustrated for clarity), the angle of inclination of each cord being determined by the horizontal distance between the two eyes through which that cord passes in the bottom and comber boards.

Supposing that it is required to weave the selvedges on a wider fabric, the boards 14, 15 are moved to the positions shown in chain dotted lines. Now it will be observed that the length of the inclined stretch of each cord increases when the comber boards are moved apart. This causes the springs 17 to extend or the lingoes to rise and the mail eyes 18 of the healds rise to a new level a distance "x" above their old level. It is necessary of course, to maintain the eyes 18 always at the same starting level for good weaving, and consequently the boards 14 and 15 have to be adjusted vertically as well as horizontally. This presents practical difficulties.

Referring now to the diagram of FIGURE 2, a selvedge Jacquard 20 is fixed on a frame 21. Again there is a bottom board 22, with harness cords 23 and selvedge comber boards 24 and 25. Also there are heald wires 26, heald springs or lingoes 27 and mail eyes 28 all of which function in the conventional manner. In this arrangement however, between each hole 56 in the bottom board 22 and its corresponding hole 57a or 57b in one of the comber boards 24 and 25, there is a flexible tube 29 and the cord 23 passes through this tube and its respective hole in the bottom board and comber board. The tubes 29 have to be long enough to stretch between the two boards even when the comber board is at the maximum width, so that for any narrower setting of the comber board, the tubes 29 will adopt a more curved formation. Nevertheless, the important feature of the arrangement is that the tubes 29 compel their respective cords to follow the curved path adopted by the tubes and the length of this path is always constant. Each tube is shape retaining and regardless of shape contains the same length of cord therein so that the length of cord between the bottom board and comber board is maintained constant for all laterally adjusted positions of the comber board. The tube ends are preferably fixed to the bottom board and comber board in the same manner as shown fixed to the comber board in FIGURE 4. Consequently, when the comber boards are adjusted horizontally, there is no vertical movement of the heald eyes to compensate. This is the major advantage offered by the invention.

There are certain other advantages. First there is a complete elimination of the necessity for hecks or guide rollers or pulleys to guide the cords between the bottom and comber boards. Secondly, it is possible to adjust the comber boards to any width between their limits of movement (i.e. there is so-called infinite adjustment rather than stepped adjustment.) The time necessary for carrying out an adjustment of width is greatly reduced and there is greater freedom to position the Jacquard mechanism where desired on the loom. Finally, and this would apply to other Jacquards besides selvedge Jacquards, the cords take longer to wear and run smoother because they are well separated by the tubes and they do not pass around sharp corners.

Turning now to the specific embodiment shown in FIGURES 3 and 4, a steel framework 31 has legs 32 by means of which it is supported above a loom 33, and a selvedge Jacquard mechanism 34 of known kind is fixed on the frame 31. The mechanism is intended to control the weaving of selvedges at both sides of the loom and the frame 31 supports two identical sets of harness apparatus 35a and 35b only one of which will be described in detail. Two spaced apart bars 36 and 37 project downwardly from the top member of the framework 31, and two vertically spaced parallel horizontal rods 38 and 39 extend between the bars 36 and 37.

A vertical carrier rod 40 is screwed at its upper end, and two slide bosses 41 are locked on it by means of nuts 42. Each boss 41 runs on one of the guide rods 38 and 39, so that the carrier rod can be adjusted horizontally. Locking screws 42a are provided in the bosses for locking the carrier rod in a selected position. Just below the bosses 41 there is a small selvedge comber board 43 locked on to the carrier rod 40 by nuts 44. This comber board has a special construction which will be described later, but at this stage it is sufficient to note that it is formed with the usual holes to receive harness cords 45.

At the lower end of the carrier rod there is a foot 46 and this serves as an anchor for a series of heald tension springs 47, each of which is attached at its upper end to a heald wire 48. Each heald wire is attached at its upper end to one of the harness cords, and the arrangement is such that the cords hold the heald wires in a vertical position with the springs 47 taut. If any heald wire is raised by its cord (to open the warp shed) the appropriate spring is stretched. Weight lingoes could be used instead of springs and then the foot 46 would not be required.

Each harness cord 45 is enclosed in a flexible plastic tube 30 where it passes between the bottom board 50 of the Jacquard 34 and the comber board 43. Each tube is flexible enough to adopt a curved formation as indicated in FIGURE 3, but it must be stiff enough to maintain its formation and to compel its cord to follow the curved path. Nylon tubes are quite suitable, and the internal diameter has the same relationship to the diameter of the harness cord as the diameter of a hole in a conventional comber board. The ends of the tubes must be fastened to the bottom board or the comber board as the case may be, and one method of doing this is shown in FIGURE 4. For this purpose, the board 43 is made in two parts 51 and 52, and each hole 53 in the upper part 51 is large enough to accept the end of a tube 30 and is flared at its lower end. The tube 30 is made bell mouthed at its lower end by heat treatment and therefore the tube cannot be pulled up out of the hole 53. The corresponding hole 54 in the lower part 52 of the board 43 is of only the same diameter as the bore of the tube 30, so that the latter cannot be pressed down through the board 43. A similar arrangement may be adopted on the bottom board 50.

The tubes 30 are long enough to allow the boards 43 to be moved to the maximum distance apart as permitted by the rods 38 and 39, so that for any narrower arrangement of the selvedges, they adopt a curved formation as shown in FIGURE 3. The harness functions as described with reference to FIGURE 2.

The tubes 30 are preferably held together in two bunches by bands 55 wrapped round them. In some cases, it might be possible to dispense with the comber boards altogether and simply clamp the ends of the tubes together at their lower ends. The term "comber board" is used in the claims in this broad sense.

What is claimed is:

1. For use in a loom having a Jacquard mechanism, a Jacquard harness comprising a bottom board, a comber board spaced from said bottom board, each of said bottom board and said comber board being provided with guide holes, flexible tubes extending between said bottom board and said comber board, each of said tubes joining a hole in said bottom board with a hole in said comber board, and harness cords extending from said mechanism threaded through each of said tubes.

2. For use in the loom according to claim 1, said comber board being mounted for horizontal adjustment.

3. For use in the loom according to claim 1, each of said tubes being secured at one end to said bottom board and at the other end to said comber board.

4. A Jacquard arrangement for a loom comprising a mounting frame, a Jacquard mechanism mounted on said frame, a bottom board fixed relatively to said mounting frame, a comber board movable widthwise on said mounting frame, each of said bottom board and said comber board being drilled to provide a plurality of guide holes, a plurality of flexible tubes corresponding with said holes in said bottom board and said comber board, each of said tubes being secured at one end to said bottom board and at the other end to said comber board to provide a closed path between corresponding holes in said two boards, and harness cords extending from said Jacquard mechanism through said bottom board, said tubes and said comber board.

References Cited

UNITED STATES PATENTS

| 7,990 | 3/1851 | Scott et al. | 139—60 |
| 1,150,396 | 8/1915 | Seckler | 139—86 |
| 2,078,091 | 4/1937 | Matthews | 139—86 |
| 2,675,833 | 4/1954 | Foster | 139—65 |
| 3,236,264 | 2/1966 | Strach | 139—59 |

FOREIGN PATENTS

| 140,500 | 4/1903 | Germany. |
| 280,736 | 12/1930 | Italy. |
| 738,148 | 10/1932 | France. |
| 828,074 | 2/1960 | Great Britain. |
| 994,962 | 8/1951 | France. |
| 956,903 | 4/1954 | Great Britain. |

MERVIN STEIN, *Primary Examiner.*

J. KEE CHI, *Assistant Examiner.*